United States Patent
Manber et al.

(10) Patent No.: US 9,678,489 B1
(45) Date of Patent: Jun. 13, 2017

(54) WEARABLE MOBILE COMPUTER CASES

(71) Applicant: Google Inc., Mountain View, CA (US)

(72) Inventors: Udi Manber, Los Altos Hills, CA (US); Matthew Amacker, Santa Clara, CA (US); Nandan Dixit, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 714 days.

(21) Appl. No.: 14/143,202

(22) Filed: Dec. 30, 2013

Related U.S. Application Data (60) Provisional application No. 61/829,953, filed on May 31, 2013.

(51) Int. Cl.
| | | |
|---|---|---|
| *A45F 5/02* | (2006.01) | |
| *G05B 15/02* | (2006.01) | |
| *A45F 5/00* | (2006.01) | |

(52) U.S. Cl.
CPC .............. *G05B 15/02* (2013.01); *A45F 5/00* (2013.01); *A45F 5/02* (2013.01)

(58) Field of Classification Search
CPC ... G05B 15/02; F16M 13/04; A45F 2005/006; A45F 2200/0533; A45F 2200/0508; A45F 2200/0525; A45F 5/00; A45F 5/02; A45F 3/14; A45F 2200/0516; G06F 1/163; H04N 5/23203; H04N 7/185; G08B 13/19695; G08B 13/19689
USPC .................................. 224/197, 188, 182, 930
See application file for complete search history.

(56) References Cited

U.S. PATENT DOCUMENTS

| | | | | |
|---|---|---|---|---|
| 7,143,912 B2* | 12/2006 | Caneba | ................ | A45C 13/262 224/153 |
| 2004/0180631 A1* | 9/2004 | Lim | ...................... | H04B 1/385 455/90.3 |
| 2008/0156953 A1* | 7/2008 | Oh | ......................... | F16M 11/08 248/284.1 |
| 2010/0171021 A1* | 7/2010 | Smith | ................... | A45C 13/30 248/558 |
| 2013/0214022 A1* | 8/2013 | Harvey | ............... | F16M 11/041 224/623 |

OTHER PUBLICATIONS

Steve Hodges et al., "SenseCam: A wearable camera which stimulates and rehabilitates autobiographical memory," Memory, Oct. 2011, 19(7):685-96.

'Lifecasting (video stream),' Wikipedia [online], retrieved from <<http://en.wikipedia.org/wiki/Lifecasting_(video_stream)>>, retrieved Apr. 2, 2013, 8 pages.

* cited by examiner

*Primary Examiner* — Nathan J Newhouse
*Assistant Examiner* — Matthew Theis
(74) *Attorney, Agent, or Firm* — Fish & Richardson P.C.

(57) ABSTRACT

A device includes a case for holding a mobile computer against a user's body so that a camera of the mobile computer faces away from the user's body. The device includes a wedge assembly, including a hinge and a wedge piece for contacting the user's body. The mobile computer can cause the wedge piece to rotate about the hinge, thereby positioning the case to an angle with respect to the user's body.

20 Claims, 4 Drawing Sheets

FIG. 3

WEARABLE MOBILE COMPUTER CASES

CROSS-REFERENCE TO RELATED APPLICATIONS

This application claims priority to U.S. Provisional Application Ser. No. 61/829,953, filed May 31, 2013, the entire contents of which are hereby incorporated by reference.

BACKGROUND

This specification relates to wearable technology.

Designers of computing devices are able to incorporate increasingly more computing power into smaller devices that can be placed on a person's body. Digital cameras are becoming commonplace in various devices, and mobile phones are becoming ubiquitous. Some cameras are designed to be attached to a helmet or another place on a person's body for capturing video clips of events. These cameras typically record and store video clips of an event, and a person can later move the video clips onto a computer.

SUMMARY

This specification describes technologies relating to a device for holding a mobile computer against a user's body.

In general, one innovative aspect of the subject matter described in this specification can be embodied in a device including a case for holding a mobile computer against a user's body so that a camera of the mobile computer faces away from the user's body; a control circuit coupled to the case and configured to receive a control signal from the mobile computer; and a wedge assembly coupled to the case and the control circuit, the wedge assembly comprising a hinge and a wedge piece for contacting the user's body; wherein the control circuit is configured to control the wedge assembly using the control signal from the mobile computer by causing the wedge piece to rotate about the hinge, thereby positioning the case to an angle with respect to the user's body.

These and other embodiments can each optionally include one or more of the following features. The wedge assembly comprises: a worm drive coupled to the control circuit; and a wedge connector coupled to the worm drive and the wedge piece. The worm drive comprises: a worm coupled to the wedge connector; and a motor configured to turn the worm so that, when the worm turns, the wedge connector moves in a direction parallel to the worm, thereby causing the wedge piece to rotate about the hinge. The control circuit is configured to cause the motor to turn clockwise or counterclockwise based on the control signal from the mobile computer. The wedge connector is coupled to the wedge piece at a wedge loop of the wedge piece; the wedge connector comprises a connector loop at an end of the connector that couples to the wedge loop; and the wedge assembly comprises a ring looped through both the wedge loop of the wedge piece and the connector loop of the wedge connector. The device includes a lanyard for hanging the case around a neck of the user. The device includes a garment connector for connecting the case to a garment worn by user. The wedge assembly is coupled to the case near a top end of the case, and wherein the garment connector is coupled to the case near a bottom end of the case opposite the top end. The garment connector is configured to accept (i) a button from the shirt of the user, or (ii) a pinch of fabric from the garment worn by the user. The case has a case length in a direction of the user's body, the wedge has a wedge length, and the case length is approximately ¾ to ½ a length of the mobile computer and the wedge length is approximately ¼ to ½ the length of the mobile computer.

In general, another innovative aspect of the subject matter described in this specification can be embodied in a method performed by a control circuit of a device, the method comprising: receiving a control signal from a mobile computer in a case of the device, the case being coupled to the control circuit, the case holding the mobile computer against a user's body so that a camera of the mobile computer faces away from the user's body; controlling, using the control signal from the mobile computer, a wedge assembly coupled to the case and the control circuit, the wedge assembly comprising a hinge and a wedge piece contacting the user's body by causing the wedge piece to rotate about the hinge, thereby positioning the case to an angle with respect to the user's body.

Particular embodiments of the subject matter described in this specification can be implemented so as to realize one or more of the following advantages. A user can engage in a real time interactive assistance session with an expert assistant by a mobile computer held against the user's body by a movable case. The user's hands can be kept free by securing the case to the user, e.g., by a lanyard or a garment connector or both. The expert assistant can provide live feedback to the user, e.g., by an audio feed played to the user. A remote user can position the case, and therefore a camera of the mobile computer, to an angle with respect to the user's body.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
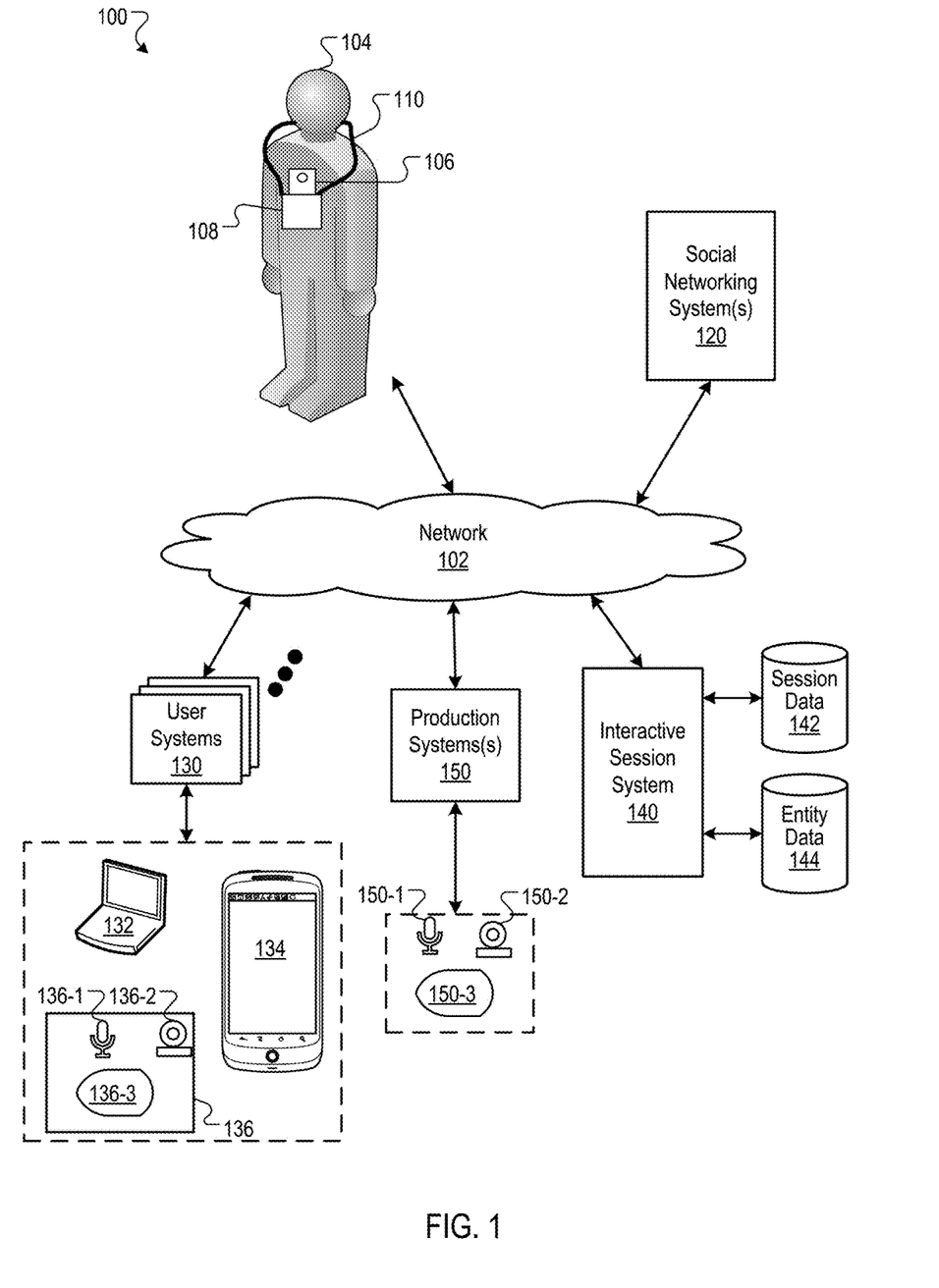
FIG. 1 is a block diagram of an example environment in which a user can send images from a mobile computer over a data communication network.

FIG. 1 is a block diagram of an example environment 100 in which a user 104 can send images from a mobile computer 106 over a data communication network 102. The mobile computer can connect to the network, for example, by a cellular network or by connecting to a Wi-Fi hotspot. A case 108 holds the mobile computer against the user's body and hangs by a lanyard 110 around the user's neck.

The data communication network 102 enables data communication between multiple electronic devices. Users can access content, provide content, exchange information, and participate in interactive sessions by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A user device 130 receives images and other optional information from the mobile computer 106 and presents them to a different user. A user device 130 is an electronic device, or collection of devices, that is capable of requesting and receiving resources over the network 102. Example user devices 130 include personal computers 132, mobile communication devices 134, and other devices that can send and receive data 136 over the network 102. A user device 130 typically includes a user application, e.g., a web browser, that sends and receives data over the network 102, generally in response to user actions. The web browser can enable a user to display and interact with text, images, videos, music and other information typically located on a web page at a website on the world wide web or a local area network.

A social networking system 120 provides various functions for social networking. The system 120 stores user identifiers and, for each user identifier, user information. The user information can include a profile of the user's background (e.g., interests, activities, career history), pictures, and postings that are shared with other users. The user information includes connections to other user identifiers. The connections can be to other users who are, for example, friends, coworkers, relatives, and business partners. The user information can include grouping information categorizing the connections into categories, e.g., so that certain postings or other information are only shared with users in a certain category.

An interactive session system 140 is also accessible by the user devices 130 and the hat camera system 106 over the network 102. The interactive session system 140 serves interactive sessions and data related to interactive sessions to users. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents his intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 140 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by expert assistants or non-expert users. The term "expert assistant" is used in this specification to refer to a user or entity that has been accepted by the system 140 for a category, e.g., as a result of the user's or entity's having provided credentials or demonstrated a high level of skill. Examples include a licensed contractor for construction related videos or a company that produces sessions for a particular product the company manufactures and a user that has produced a large number of highly rated sessions.

Production systems 150 can be used to create sessions. Production systems 150 may range from studios to simple hand-held video recording systems. Generally, a production system 150 is a system that includes one or more of an audio input device 150-1, a video input device 150-2, an optional display device 150-3, and optionally other input and output devices and production processes that are used to create sessions. For example, post production processes may be used to add metadata to an interactive session. Such metadata may include, for example, keywords and topical information that can be used to classify the session to one or more topical categories; a list of tools and parts required for a particular session and descriptions of the tools and parts; and so on.

Tactical sensory input devices may also be used in a production system 150. For example, a particular interactive session may provide input data for a "G-suit" that applies pressure to a user's body and that the user interprets as simulated motion. Accordingly, appropriate input systems are used in the production system 150 to generate and store the input data for the interactive session.

Production systems 150 may also be or include devices that are attached to a person. For example, for "point of view" sessions, wearable computer devices that include a camera input device and microphone input device may be worn on a user's person during the time the user is creating the session.

The sessions are stored as sessions data 142 and are associated with authoring entities by entity data 144. A user can use a user device 130 to access the interactive session system 140 to request a session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

A user experiences a session by use of one or more user devices 130 or the mobile computer 106 or both. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time or near-real time. A real time or near-real time interactive session can be an interactive session that is created in response to a user request for the interactive session. For example, real-time or near-real time sessions may be provided by a company for repairing a product sold by the company when the user cannot find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

The mobile computer 106 can facilitate an interactive session for the user 104 in real time or near-real time. For example, suppose the user 104 is attempting to jump start a car and desires expert assistance. The user 104 connects to an interactive session on the interactive session system 140 for automotive assistance and then hangs the mobile computer 106 from the user's neck by the case 108 and lanyard 110. A camera of the mobile computer faces away from the user.

Once connected, an expert assistant can see a live image stream from the camera of the mobile computer. The expert can speak into a microphone and transmit audio instructions to the user 104, where speakers on the mobile device 106 play the audio instructions. In this manner, the expert assistant can instruct the user on issues that would be difficult to work on without images, e.g., on a suitable location for a ground clamp, or on whether or not the battery terminals are too corroded for a proper electrical connection.

The mobile computer 106 can also facilitate a sharing session on the social networking system 120. For example, the user can use the mobile computer 106 to log in to the social networking system 120, set up a video chat session, and then invite other users to join. The other users can then view live video footage from the mobile computer's camera, hear the user speaking through a microphone, send messages to the mobile computer, and so on.

The case 108 for the mobile computer includes a control circuit coupled to the case and configured to receive a control signal from the mobile computer. The control circuit is coupled to a wedge assembly coupled to the case. In operation, the control circuit controls the wedge assembly using the control signal from the mobile computer, thereby positioning the case to an angle with respect to the user's body. In this manner, the case facilitates a tilt function for the camera in the mobile computer. Examples of cases and wedge assemblies are illustrated in FIGS. 2A-D.

In some implementations, a remote user on a user device 130 can cause the case to tilt the camera up or down. For example, suppose that the user 102 starts a video chat session with one or more remote users on the social networking system 120. The social networking system 120 can present a user interface to the remote users with a video feed from the mobile computer 106 and a user interface element to tilt the camera up or down. If the user 102 is looking at an object, and describing it by an audio feed, but the camera is not pointing at the object, a remote user can select the user interface element and cause the case to tilt the camera until the camera is pointing at the object. The social networking system 120 can route a command by the network 102 to the mobile computer 106, which in turn causes the case 108 to tilt the mobile computer.

Figure 2A:
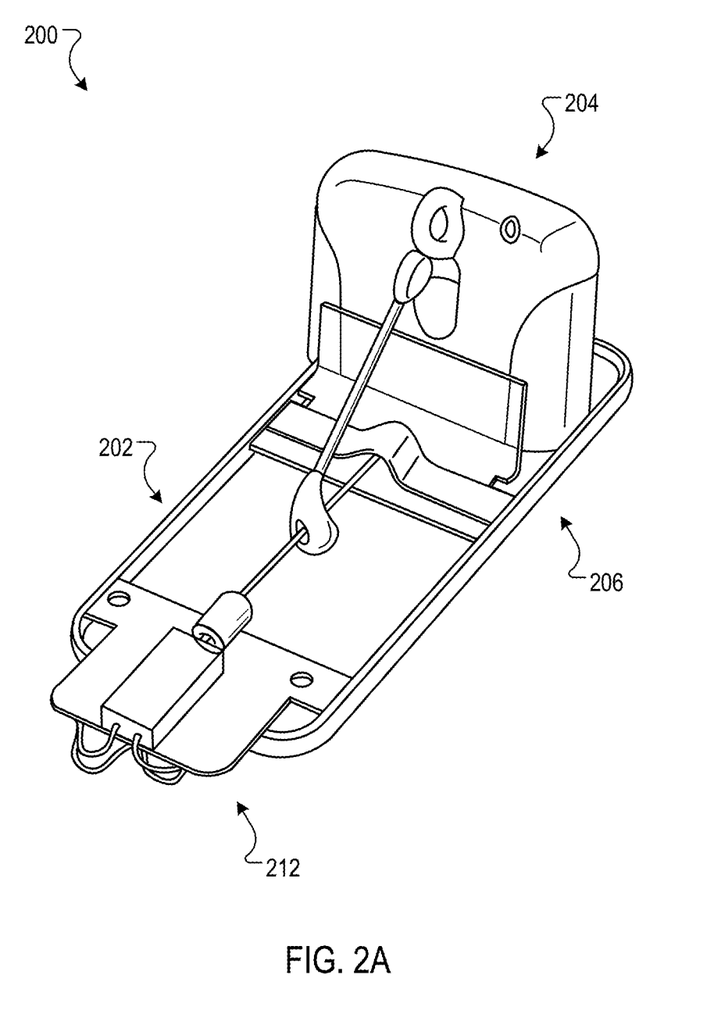
FIGS. 2A-D are views of an example device for holding a mobile computer against a user's body.

FIG. 2A is a perspective view of an example wearable device 200 for holding a mobile computer against a user's body. The view is of the back of the device, that is, the side of the device facing the user's body.

The device includes a case 202 for holding the mobile computer. The case 202 can be rectangular or semi-rectangular to hold common mobile computers, e.g., tablets and phones. The device 200 includes a wedge piece 204 the coupled to the case 202 by one or more hinges 206. The wedge piece 204 and the hinges are part of a wedge assembly used to tilt the case 202.

The device 200 also includes a control circuit 208 that can be attached to or embedded in the case 202. The control circuit 208 is configured to control the wedge assembly using a control signal from the mobile computer by causing the wedge piece to rotate about the hinge. When the device is holding the mobile computer against the user's body, rotating the wedge piece about the hinge allows the mobile computer to position the case to an angle with respect to the user's body.

Figure 2B:
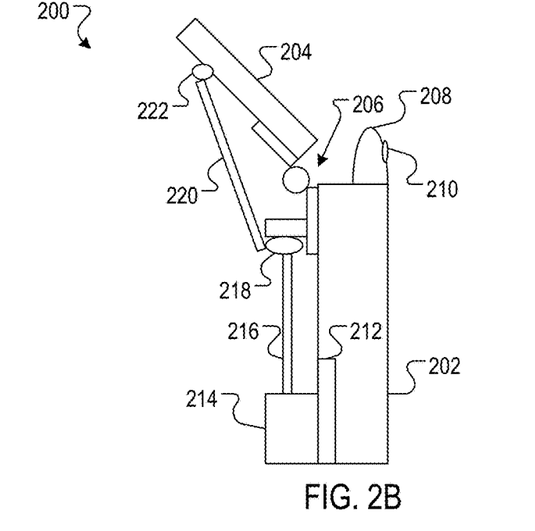

FIG. 2B is a side view of the device 200 holding a mobile computer 208 with a camera 210 facing away from the back of the device. The wedge assembly includes a motor 214 and a worm 216 that is driven by the motor. The motor 213 is typically an electric motor that drives a worm wheel. The motor and the worm, together, comprise a worm drive.

The worm 216 is coupled to a wedge connector 220 (e.g., a rod) at a worm end 218 of the wedge connector 220. The wedge connector 220 is coupled to the wedge piece 204 at a wedge end 222 of the wedge connector. The motor is configured to turn the worm so that, when the worm turns, the wedge connector 220 moves in a direction parallel to the worm. The worm end 218 of the wedge connector 220 moves as the worm turns, and the wedge end 222 of the wedge connector 220 rotates to cause the wedge piece 204 to rotate about the hinge 206.

The control circuit 212 can be configured to cause the motor to turn clockwise or counter-clockwise based on a control signal from the mobile computer. In some implementations, the mobile computer mates with a connector at the bottom of the case to connect to the control circuit 212. The mobile computer can mate, for example, with a dock connector, a USB connector, a connector for an audio jack, or the like. In some implementations, the mobile computer transmits the control signal wirelessly to the control circuit 212, e.g., by Bluetooth.

The control circuit 212 can be implemented using digital components or analog components or both. For example, the control circuit can be implemented as a digital integrated circuit coupled to a motor driver for the motor, or the control circuit can be implemented as an electrical amplifier that drives the motor by amplifying the control signal from the mobile computer.

In some implementations, the device 200 further includes a garment connector for connecting the case to a garment worn by the user. The wedge assembly can be coupled to the case near a top end of the case, and the garment connector is coupled to the case near a bottom end of the case opposite the top end, e.g., outside or next to the motor 214. The garment connector can be configured to accept a button from the shirt of the user, or a pinch of fabric from the garment worn by the user.

The garment connector can be used in addition to or instead of a lanyard that goes around the user's neck. In some implementations, the case has a length approximately ¾ to ½ a length of the mobile computer and the wedge piece has a length approximately ¼ to ½ the length of the mobile computer.

Figure 2C:
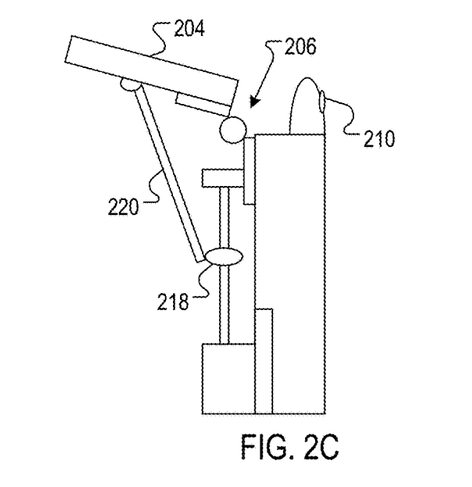

FIG. 2C is a side view of the device 200 after the wedge piece 204 has rotated about the hinge 206 away from the case 202. The worm end 218 of the wedge connector 220 has moved closer to the bottom of the case by movement of the worm. If the device were held against a user's body, this would cause the camera 210 to tilt downwards by moving the case away from the user's body.

Figure 2D:
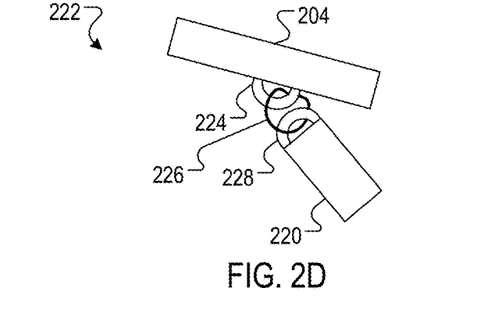

FIG. 2D is a detailed view of the wedge end 222 of the wedge connector 220. The wedge connector 220 is coupled to the wedge piece 204 at a wedge loop 224 of the wedge piece 204. The wedge connector 220 includes a connector loop 228 at the wedge end 222. A ring 226 joins the wedge loop 224 and the connector loop 228 by being looped through both loops. Arranging the loops and ring in this manner allows the wedge connector 220 to rotate about the wedge end 222 as the worm turns so that the wedge piece 204 can rotate about the hinge 206.

Figure 3:
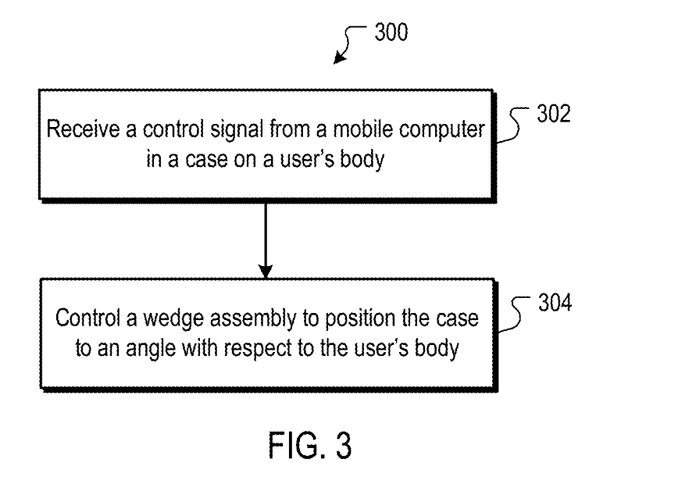
FIG. 3 is a flow diagram of an example method performed by a control circuit for a device for holding a mobile computer.

FIG. 3 is a flow diagram of an example method 300 performed by a control circuit for a device for holding a mobile computer. The device can be the device 200 of FIGS. 2A-D.

The control circuit receives a control signal from a mobile computer in a case of the device (302). The case is coupled to the control circuit, and the case is holding the mobile computer against a user's body so that a camera of the mobile computer faces away from the user's body.

The control circuit controls, using the control signal from the mobile computer, a wedge assembly coupled to the case and the control circuit (304). The wedge assembly includes at least a hinge and a wedge piece contacting the user's body. The control circuit causes the wedge piece to rotate about the hinge, thereby positioning the case to an angle with respect to the user's body.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A device comprising:
   a case for holding a mobile computer against a user's body so that a camera of the mobile computer faces away from the user's body;
   a control circuit coupled to the case and configured to receive a control signal from the mobile computer; and
   a wedge assembly coupled to the case near a top end of the case, the wedge assembly comprising:
      a hinge;
      a wedge piece for contacting the user's body;
      a drive coupled to the control circuit;
      a wedge connector coupled to the drive and coupled to the wedge piece, wherein the wedge connector is rotatably coupled to the wedge piece at a wedge loop of the wedge piece, wherein the wedge connector comprises a connector loop at an end of the wedge connector that couples to the wedge loop of the wedge piece; and
      a ring looped through both the wedge loop of the wedge piece and the connector loop of the wedge connector; and
   a garment connector for connecting the case to a garment worn by the user, wherein the garment connector is coupled to the case near a bottom end of the case opposite the top end;
   wherein the control circuit is configured to control the wedge assembly using the control signal from the mobile computer by causing the wedge connector to rotate about the end of the wedge connector and causing the wedge piece to rotate about the hinge, thereby positioning the case to an angle with respect to the user's body.

2. The device of claim 1, wherein the drive comprises:
   a worm coupled to the wedge connector; and
   a motor configured to turn the worm so that, when the worm turns, the wedge connector moves in a direction parallel to the worm, thereby causing the wedge piece to rotate about the hinge.

3. The device of claim 2, wherein the control circuit is configured to cause the motor to turn clockwise or counterclockwise based on the control signal from the mobile computer.

4. The device of claim 1, further comprising a lanyard for hanging the case around a neck of the user.

5. The device of claim 1, wherein the garment connector is configured to accept (i) a button from the shirt of the user, or (ii) a pinch of fabric from the garment worn by the user.

6. The device of claim 1, the mobile computer being held by the case, the case having a case length in a direction of the user's body, the wedge having a wedge length, wherein the case length is approximately ¾ to ½ a length of the mobile computer and the wedge length is approximately ¼ to ½ the length of the mobile computer.

7. A method performed by a control circuit of a device, the method comprising:
   receiving a control signal from a mobile computer in a case of the device, the case being coupled to the control circuit, the case holding the mobile computer against a user's body so that a camera of the mobile computer faces away from the user's body, wherein the device comprises a garment connector for connecting the case to a garment worn by the user, wherein the garment connector is coupled to the case near a bottom end of the case;
   controlling, using the control signal from the mobile computer, a wedge assembly coupled to the case near a top end of the case, the wedge assembly comprising:
      a hinge;
      a wedge piece for contacting the user's body;
      a drive coupled to the control circuit;
      a wedge connector coupled to the drive and coupled to the wedge piece, wherein the wedge connector is rotatably coupled to the wedge piece at a wedge loop of the wedge piece, wherein the wedge connector comprises a connector loop at an end of the wedge connector that couples to the wedge loop of the wedge piece; and
      a ring looped through both the wedge loop of the wedge piece and the connector loop of the wedge connector;
   wherein the control circuit controls the wedge assembly using the control signal from the mobile computer by causing the wedge connector to rotate about the end of the wedge connector and causing the wedge piece to rotate about the hinge, thereby positioning the case to an angle with respect to the user's body.

8. The method of claim 7, wherein the drive comprises:
a worm coupled to the wedge connector; and
a motor configured to turn the worm so that, when the worm turns, the wedge connector moves in a direction parallel to the worm, thereby causing the wedge piece to rotate about the hinge.

9. The method of claim 8, wherein controlling the wedge assembly comprises causing the motor to turn clockwise or counter-clockwise based on the control signal from the mobile computer.

10. The method of claim 7, wherein the device comprises a lanyard for hanging the case around a neck of the user.

11. The method of claim 7, wherein the garment connector is configured to accept (i) a button from the shirt of the user, or (ii) a pinch of fabric from the garment worn by the user.

12. The method of claim 7, the mobile computer being held by the case, the case having a case length in a direction of the user's body, the wedge having a wedge length, wherein the case length is approximately ¾ to ½ a length of the mobile computer and the wedge length is approximately ¼ to ½ the length of the mobile computer.

13. A system comprising:
a mobile computer comprising a camera;
a remote controller computer comprising a display; and
a device comprising:
    a case for holding the mobile computer against a user's body so that the camera of the mobile computer faces away from the user's body, wherein the mobile computer provides image data from the camera to the remote controller computer for presentation on the display;
    a control circuit coupled to the case and configured to receive a control signal from the mobile computer, wherein the control signal is provided in response to a command from the remote computer to tilt the case; and
    a wedge assembly coupled to the case, the wedge assembly comprising a hinge and a wedge piece for contacting the user's body;
    wherein the control circuit is configured to control the wedge assembly using the control signal from the mobile computer by causing the wedge piece to rotate about the hinge, thereby positioning the case to an angle with respect to the user's body.

14. The system of claim 13, wherein the wedge assembly comprises:
a drive coupled to the control circuit; and
a wedge connector coupled to the drive and coupled to the wedge piece.

15. The system of claim 14, wherein the drive comprises:
a worm coupled to the wedge connector; and
a motor configured to turn the worm so that, when the worm turns, the wedge connector moves in a direction parallel to the worm, thereby causing the wedge piece to rotate about the hinge.

16. The system of claim 15, wherein the control circuit is configured to cause the motor to turn clockwise or counter-clockwise based on the control signal from the mobile computer.

17. The system of claim 14, wherein:
the wedge connector is coupled to the wedge piece at a wedge loop of the wedge piece;
the wedge connector comprises a connector loop at an end of the connector that couples to the wedge loop; and
the wedge assembly comprises a ring looped through both the wedge loop of the wedge piece and the connector loop of the wedge connector.

18. The system of claim 13, further comprising a lanyard for hanging the case around a neck of the user.

19. The system of claim 13, further comprising a garment connector for connecting the case to a garment worn by user, wherein the wedge assembly is coupled to the case near a top end of the case, and wherein the garment connector is coupled to the case near a bottom end of the case opposite the top end.

20. The system of claim 19, wherein the garment connector is configured to accept (i) a button from the shirt of the user, or (ii) a pinch of fabric from the garment worn by the user.

* * * * *